Feb. 15, 1966 R. O. RICE ETAL 3,234,613
MECHANICAL CONNECTORS
Filed April 29, 1964
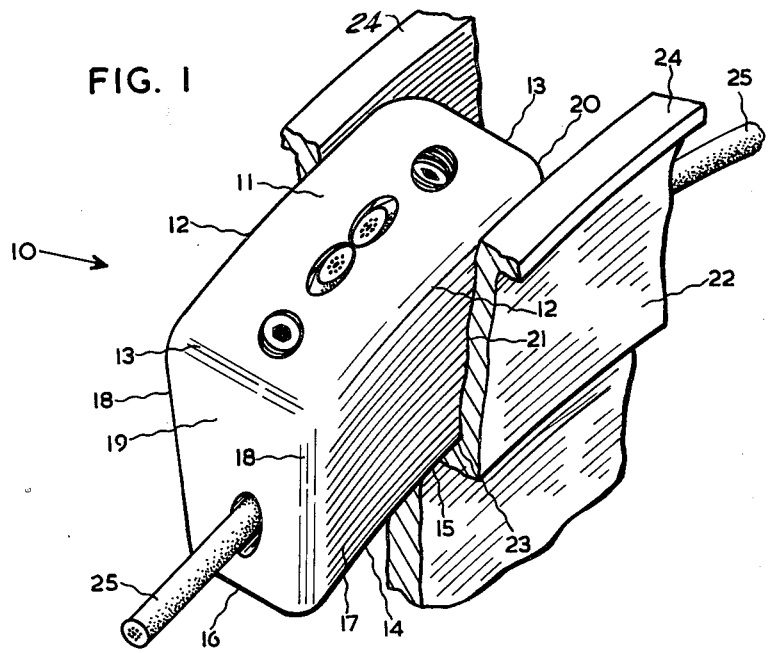
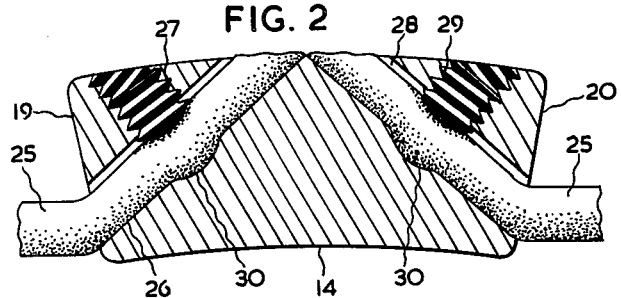
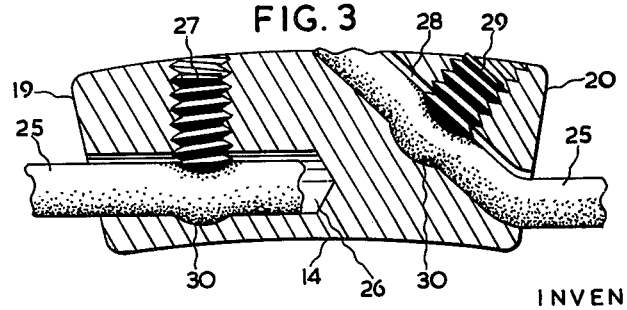
INVENTORS:
RAY O. RICE
RICHARD R. RICE
BY: Church & Rogers
PATENT AGENTS

United States Patent Office 3,234,613
Patented Feb. 15, 1966

3,234,613
MECHANICAL CONNECTORS
Ray O. Rice, 1888 Main St. E., and Richard R. Rice,
56 Martha St., both of Hamilton, Ontario, Canada
Filed Apr. 29, 1964, Ser. No. 363,558
6 Claims. (Cl. 24—125)

This invention is concerned with improvements in or relating to mechanical connectors and especially, but not exclusively, to mechanical connectors intended for connecting together the two ends of a domestic clothesline to form a continuous looped line.

There is a continuing need for a simple, effective and inexpensive mechanical connector for connecting together the two ends of a flexible rope or line, such as a domestic clothesline. Such a connector must be simple, so as to be inexpensive; it must permit ready adjustment of the length of the line since such lines tend to stretch in use, whereupon they sag excessively; it must hold the ends securely and firmly under the severe stresses applied thereto by a heavily loaded line in a breeze; and it must not foul and jam the pulleys around which the line passes.

It is an object of the present invention to provide a new form of mechanical connector adapted to connect together the ends of a flexible member such as a line or rope.

It is a particular object of the invention to provide a new mechanical connector that is simple and effective in operation, inexpensive to manufacture, and adapted to pass through the conventional clothesline pulley without fouling and jamming therein.

According to the present invention there is provided an improved mechanical connector comprising a body having an elongated top surface, two elongated side surfaces each of which has a longer side in common with a corresponding longer side of the top surface, an elongated bottom surface having its longer sides in common with the remaining longer sides of the said side surfaces, and two end surfaces each having its sides in common with corresponding shorter sides of the said top, bottom and side surfaces, said top and bottom surfaces being of arcuate form struck about substantially the same axis, the said side surfaces being of corresponding segmental annular form, and said end surfaces being of truncated triangular form, a first bore for the reception of a line to be connected extending from one end surface into the body, first line clamping means co-operatively associated with the said first bore for the retention therein of a line inserted into the said first bore, a second through bore for the reception of a line to be connected extending from the other end surface into the body, and second line clamping means co-operatively associated with the second bore for the retention therein of a line inserted into the said second bore.

Alternatively, one of the second bores may be a blind bore. Preferably, the said bores open in the said end faces between the side thereof in common with the bottom surface and a plane passing through the centre of gravity of the device and generally parallel to the bottom surface.

Particular preferred embodiments of the invention will now be described, by way of example, with reference to the accompanying drawings wherein:

FIGURE 1 is a perspective view of a first embodiment, and illustrating its co-operative engagement in the groove of a conventional grooved pulley, FIGURE 2 is a longitudinal section through the embodiment of FIGURE 1, and FIGURE 3 is a longitudinal section similar to FIGURE 2, and through a second embodiment.

Similar parts are given the same reference number in all the figures of the drawing.

Referring now especially to FIGURES 1 and 2, the particular embodiment shown therein comprises a body 10 having a top surface 11 of elongated form, e.g.; generally rectangular, with longer sides 12 and shorter sides 13. A bottom surface 14 is also of elongated, generally rectangular form with longer sides 15 and shorter sides 16. The two surfaces 11 and 14 are substantially parallel to one another being struck a common axis extending generally parallel to the edges 13 and 16. The body has two sides surfaces 17 of elongated form, each having the two sides 12 and 15 as its longer sides, and each having two shorter sides 18; because of the arrangement of the two surfaces 11 and 14 the surfaces 17 each have the general form of a segment of an annulus. The two end faces 19 and 20 of the body are of progressively decreasing width in a radially inward direction, and are described as being of truncated triangular shape.

It will now be apparent that the shape of the body 10 is such that it fits snugly within the truncated-triangular-section groove 21 of a conventional clothesline pulley 22. Moreover the depth of the body is substantially equal to the depth of the groove and the radius of the surfaces 11 and 14 is arranged to be at least approximately the same as that of the said conventional pulley, so that the surface 14 conforms to bottom surface 23 of the pulley groove, and the top surface 11 conforms to radially outer pulley edges 24.

A line 25 has one end thereof passed through a first through bore 26, which extends from the end surface 19 to approximately the centre of the top surface 11, the line being retained in the bore by an allen-type set screw 27 working in a corresponding screw threaded bore which has its longitudinal axis substantially perpendicular to the longitudinal axis of the bore 26. Although the connector has been described above as connecting together the two ends of the same line, it will be apparent that it can be employed to connect together two different lines, which may be of different sizes. The other end of the line 25 passes through a second through bore 28 extending from the end surface 20, also to approximately the centre of the top surface 11, this end being retained by a respective screw 29 arranged similarly to the screw 27. A counter bore 30 is provided in the wall of each bore 26 and 28 opposite to each screw bore, and in operation each screw is tightened until the line is forced into the counter-bore, resulting in an extremely firm and secure retention of the line ends.

In operation, one end of the line is clamped in the connector, the line is threaded around the two clothesline pulleys that usually are provided, the other line end is threaded into the connector, and the line hauled up tight and clamped. The ends of the line protruding from the surface 11 are then cut off flush with that surface. The lengths of the screws 27 and 29 are such that when turned fully home they also are flush, with, or below, the surface 11. It is now found that the line can be treated as an endless loop, and that the connector will pass through the pulley 22 without jamming and fouling the frame (not shown) by which the pulley is mounted. In practical tests it has been observed that no fouling takes place even when the connector approaches the pulley groove in an inverted position, since the first contact of the connector with the pulley causes it to execute a half-turn, so that it enters the groove with the proper orientation. To assist this automatic righting action all of the corners of the body are smoothly rounded.

It is believed that this action is also assisted by the proper location of the entrances of the bores 26 and 28 in the end faces 19 and 20. It will be seen that in the embodiment disclosed these entrances are disposed between the bottom surface 14 and a plane, indicated in FIGURE 2 by reference 31, disposed parallel to the surfaces 11 and 14 and passing at least approximately through the centre of gravity of the body.

The embodiment illustrated by FIGURE 3 differs from that in FIGURES 1 and 2 only in that the bore 26 is blind and has its longitudinal axis substantially parallel to the surfaces 11 and 14.

It is preferred that at least one of the bores extend from an end surface to the top surface, since this facilitates the threading or lacing of the line through the connector and the subsequent tightening of the line before clamping the free end. It will be appreciated that if at any time the line becomes slack one end can be unclamped, the slack taken up, the free end re-clamped and the protruding end trimmed down.

In a particular embodiment, intended to be used with a pulley of six inches diameter and a clothesline of up to $3/16$ inch diameter, the length along the sides 12 was $1\frac{9}{16}$ inches and along the sides 15 was $1\frac{1}{4}$ inch, the width along the sides 13 was $\frac{1}{2}$ inch and along the sides 16 was $\frac{1}{8}$ inch, and the depth along the sides 18 was $9/16$ inch. The bores were of $3/16$ inch diameter with their entrance centres spaced $3/16$ inch from the sides 16, and the allen-type set screws were of $\frac{1}{4}$ inch diameter. The body preferably is moulded or die-cast, although other methods of production can of course be used, and preferably it is of a non-corroding metal.

What we claim is:

1. An improved mechanical connector comprising a body having an elongated top surface, two elongated side surfaces each of which has a longer side in common with a corresponding longer side of the top surface, an elongated bottom surface having its longer sides in common with the remaining longer sides of the said side surfaces, and two end surfaces each having its side in common with corresponding shorter sides of the said top, bottom and side surfaces, said top and bottom surfaces being of arcuate form struck about substantially the same axis, the said side surfaces being of corresponding segmental annular form, and said end surfaces being of truncated triangular form, a first bore for the reception of a line to be connected extending from one end surface into the body, first line clamping means co-operatively associated with the said first bore for the retention therein of a line inserted into the said first bore, a second through bore for the reception of a line to be connected extending from the other end surface into the body, and second line clamping means co-operatively associated with the second bore for the retention therein of a line inserted into the said second bore.

2. A connector as claimed in claim 1, wherein each of the said bores is a through bore extending from the respective end surface to substantially the centre of the said top surface.

3. A connector as claimed in claim 1 wherein one of the said bores is a blind bore having its longitudinal axis substantially parallel to the said top and bottom surfaces, and the other bore is a through bore extending from the respective end surface to substantially the centre of the said top surface.

4. An improved mechanical connector comprising a body having an elongated top surface, two elongated side surfaces each of which has a longer side in common with a corresponding longer side of the top surface, and elongated bottom surface having its longer sides in common with the remaining longer sides of the said side surfaces, and two end surfaces each having its side in common with corresponding shorter sides of the said top, bottom and side surfaces, said top and bottom surfaces being of arcuate form struck about substantially the same axis, the side surfaces being of corresponding segmental annular form, and said end surfaces being of truncated triangular form, a first bore for the reception of a line to be connected extending from one end surface into the body with its entrance in the end face disposed between the said bottom surface and a plane passing through the centre of gravity of the body and disposed generally parallel to the bottom surface, first line clamping means co-operatively associated with the said first bore for the retention therein of a line inserted into the said first bore, a second through bore for the reception of a line to be connected extending from the other surface into the body with its entrance in the end face disposed between the said bottom surface and the said plane, and second line clamping means co-operatively associated with the second bore for the retention therein of a line inserted into the said second bore.

5. A connector as claimed in claim 4, wherein each of the said bores is a through bore extending from the respective end surface to substantially the centre of the said top surface.

6. A connector as claimed in claim 4, wherein one of the said bores is a blind bore having its longitudinal axis substantially parallel to the said top and bottom surfaces, and the other bore is a through bore extending from the respective end surface to substantially the centre of the said top surface.

References Cited by the Examiner

UNITED STATES PATENTS 937,075    10/1909    Kline _____ 24—125 X
3,166,810    1/1965    Ensley _____ 24—125

WILLIAM FELDMAN, *Primary Examiner.*